United States Patent [19]
Sugahara et al.

[11] Patent Number: 5,780,147
[45] Date of Patent: Jul. 14, 1998

[54] LAMINATE HAVING IMPROVED DIMENSIONAL STABILITY AND HEAT RESISTANCE

[75] Inventors: Mikio Sugahara, Kawanishi; Mitsutoshi Yoshinobu, Amagasaki; Yoshiyuki Tanaka, Itami, all of Japan

[73] Assignee: Daiso Co., Ltd., Osaka, Japan

[21] Appl. No.: 614,548

[22] Filed: Mar. 13, 1996

[30] Foreign Application Priority Data

Mar. 14, 1995 [JP] Japan ................... 7-054544
Aug. 30, 1995 [JP] Japan ................... 7-221906

[51] Int. Cl.$^6$ .................. B32B 15/04; B32B 15/06; B32B 15/08
[52] U.S. Cl. .................. 428/332; 428/457; 428/252; 428/461; 428/344
[58] Field of Search .................. 428/457, 114, 428/436, 492, 515, 252, 458, 461, 465, 344, 332, 209, 225

[56] References Cited

U.S. PATENT DOCUMENTS

| | | | |
|---|---|---|---|
| 3,936,341 | 2/1976 | Nanoux | 156/242 |
| 4,443,507 | 4/1984 | Yamada et al. | 428/114 |
| 4,960,633 | 10/1990 | Hiza et al. | 428/215 |
| 5,098,779 | 3/1992 | Minnick | 428/295 |
| 5,397,618 | 3/1995 | Cedarleaf | 428/138 |

FOREIGN PATENT DOCUMENTS

| | | |
|---|---|---|
| 63-32915 | 7/1988 | Japan. |
| 2-116544 | 5/1990 | Japan. |

*Primary Examiner*—John J. Zimmerman
*Assistant Examiner*—Michael LaVilla
*Attorney, Agent, or Firm*—Foley & Lardner

[57] ABSTRACT

Disclosed is a laminate comprising a thermosetting resin-impregnated prepreg layer (A) constituting a surface layer, a rubber or thermoplastic resin layer (B) having a flexibility and a hot melt resin adhesive layer (C), the thermosetting resin-impregnated prepreg layer and rubber or thermoplastic resin layer being heat bonded through the hot melt resin adhesive layer. The layer (A) is a prepreg impregnated with a thermosetting resin selected from a diallyl phthalate resin, an unsaturated polyester, a phenol resin, an aminoalkyd resin, an epoxy resin, an acrylurethane resin and a melamine resin. The rubber or resin of the layer (B) is a rubber or a thermoplastic resin selected from chlorinated polyethylene, polybutene, ethylene-vinyl acetate copolymer, an ethylene-propylene-diene copolymer, a chloroprene polymer, chlorosulfonated polyethylene, a styrene-butadiene copolymer and polyvinyl chloride. In addition, the hot melt resin of the layer (C) is a hot melt resin having a melting point of 60° to 165° C. and a solubility parameter (SP value) of 7.4 to 10.9, selected from an ethylene-vinyl acetate copolymer an ethylene-acrylic acid copolymer, carboxylated polyethylene, polyurethane, polybutylene terephthalate and a modified ethylene-vinyl acetate copolymer.

6 Claims, 1 Drawing Sheet

LAMINATE HAVING IMPROVED DIMENSIONAL STABILITY AND HEAT RESISTANCE

FIELD OF THE INVENTION

The present invention relates to a laminate having an excellent heat resistance, which Is used for an interior material, a table, a top of a furniture, a furniture-style cooking appliance, a flooring material, etc. The laminate of the present invention is superior in a design and a dimensional stability, and has no plate warpage. In addition, the laminate is easily applied in a construction field, and prevents the scorching deformation due to a light of cigarette or a high-temperature cooking appliance.

RELATED ARTS

With respect to an interior material, a table, a top of furniture, a furniture style cooking appliance, a flooring material, etc., which are used in our daily life, there have recently been many accidents such as the generation of fire, the scorching due to high-temperature cooking utensil after cooking, etc. Since lately vinyl chloride is mainly used as the flooring material, it Is Inferior in performances such as the heat resistance, etc. Therefore, there have hitherto been used a method of increasing the amount of fillers, a method of previously coating an outer-most film with an ultraviolet curing paint, a method of coating a final product with an ultraviolet curing paint after the preparation of final product or the completion of final application to partially crosslink the surface layer, a method of forming a film constituting the surface layer by using a crosslinking type paste sol, etc., so as to improve th heat resistance. However, the scorching or deformation due to the light of cigarette is still observed, and there have never been obtained those which are suitable for the floor of an amusement arcade, playground, etc.

Japanese Laid-Open Patent Publication No. 2-116544 discloses an example of Interposing an aluminum foil between a substrate and a thermosetting resin surface layer so as to further improve a cigarette resistance. However, sheets having no flexibility (e.g. a particle board, a pulp cement board, a plasterboard, etc.) and relatively thin sheets (e.g. a prepreg obtained by impregnating a woven fabric, nonwoven fabric or reinforced sheet with a thermosetting resin, a thermoset sheet obtained by thermosetting said prepreg under pressure, etc.) are merely disclosed as the substrate, and a resin sheet having a sufficient thickness and flexibility (e.g. vinyl chloride, rubber, etc.) is not used as the substrate. Since the substrate is hard or thin as described above, the substrate can not be sufficiently embossed. For example, it is difficult to form a concave-convex pattern on the surface to impart the feel of natural stone and, therefore, it was not satisfactory in view of design. When using the hard substrate, there are problems on the application, for example, the cutting operation by a cutter can not be easily conducted in the construction field, It takes a long time for forming a mosaic pattern, it is Impossible to apply the product on the curved surface, etc. Accordingly, it has hitherto been required to solve the above problems.

SUMMARY OF THE INVENTION

The present invention provides a laminate comprising (A) a thermosetting resin-impregnated prepreg layer constituting a surface layer, (B) a rubber or thermoplastic resin layer having a good flexibility and (C) a hot melt resin adhesive layer, the thermosetting resin-impregnated prepreg, layer and rubber or thermoplastic resin layer being heat bonded through the hot melt resin adhesive layer;

wherein the layer (A) is a prepreg impregnated with a thermosetting resin selected from a dlallyl phthalate resin, an unsaturated polyester, a phenol resin, an aminoalkyd resin, an epoxy resin, an acrylurethane resin and a melamine resin; the rubber or resin of the layer (B) is a rubber or a thermoplastic resin selected from chlorinated polyethylene, polybutene, an ethylene-vinyl acetate copolymer, an ethylene-propylene-dlene copolymer, chloroprene polymer, chlorosulfonated polyethylene, a styrene-butadiene copolymer and polyvinyl chloride; and the hot melt resin of the layer (C) is a hot melt resin having a melting point of 60° to 165° C. and a solubility parameter (SP value) of 7.4 to 10.9, selected from an ethylene-vinyl acetate copolymer, an ethylene-acrylic acid copolymer, carboxylated polyethylene, polyurethane, polybutylene terephthalate and a modified ethylene-vinyl acetate copolymer.

It was impossible to adhere a thermosetting re-sin to a rubber or a thermoplastic resin, but it became possible to produce a laminate by heat bonding, using a hot melt resin having the specific melting point and solubility parameter in the present Invention. It became possible to produce a laminate which is superior in design (e.g. having a deep embossed surface) and which can be easily subjected to the cutting operation by cutter knife in the construction field while maintaining an excellent heat resistance of the thermosetting resin, by heat bonding the thermosetting resin layer with the rubber or thermoplastic resin layer having a good flexibility.

DETAILED DESCRIPTION OF THE INVENTION

Figure 1:
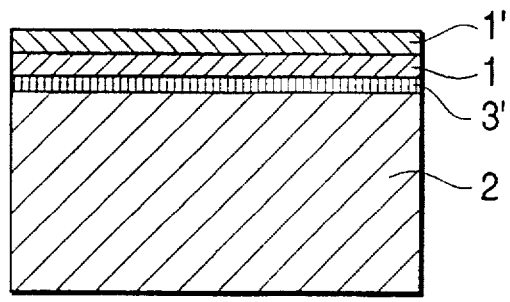
FIG. 1 is a schematic cross sectional view of a basic constitution of the laminate of the present Invention.

The thermosetting resin-impregnated prepreg layer (A) used in the present invention may be a so-called overlay prepreg forming a transparent layer after the thermosetting. The prepreg layer (A) is obtained by impregnating a substrate with a thermosetting resin. As the substrate to be impregnated, there can be used a handmade paper (for example, a Japanese paper) or a mixed paper obtained by mixing a mineral having a high thermal conductivity (e.g. alumina, etc.) with fibers such as pulp fibers (basis weight: 5 to 80 g/m$^2$), a woven or nonwoven fabric made of natural or synthetic fibers (basis weight: 5 to 80 g/m$^2$), or a pattern paper or kraft paper (basis weight: 30 to 200 g/m$^2$). Among them, the mixed paper is paticularly preferred because the scorching by the light of cigarette is prevented and the wear resistance is also improved.

The thickness of the prepreg layer (A) is preferably from 0.5 to 1.5 mm.

A single prepreg layer may be used, or a plurality of prepreg layers may also be used. By laminating an overlay prepreg on a pattern layer such as pattern paper prepreg comprising a pattern paper substrate to be impregnated, a pattern having a depth and excellent design can be formed and, at the same time, the wear resistance, the scratch resistance and the resistance to pollution by a tar of a cigarette on the surface can be improved.

The same effect as that described above can also be obtained by using an overlay prepreg layer as the layer (A) and interposing a pattern layer such as a vinyl chloride pattern paper between the layer (A) and the adhesive layer (C). In this case, the vinyl chloride pattern paper can be adhered to the overlay prepreg by the hot melt resin adhesive layer (C).

Examples of the impregnating thermosetting resin of the prepreg layer (A) Include a diallyl phthalate resin, an unsaturated polyester, a phenol resin, an aminoalkyd resin, an epoxy resin, a melamine resin, an acrylurethane resin, etc.

Regarding the amount of the thermosetting resin, the resin content (RC) (*1) is preferably from 40 to 90% by weight.
*1: Resin content (RC)=weight of resin×1 00/(weight of substrate+weight of resin) (%)

When the thermosetting resin is the diallyl phthalate resin, the unsaturated polyester, the aminoalkyd resin or the acrylurethane resin, a mixture obtained by adding a crosslinking component and a peroxide to the above resin is usually used as the impregnating solution. As the crosslinking component, there can be used a diallyl phthalate monomer, a styrene monomer, N-methylolacrylamide, vinyltoluene, methyl methacrylate, etc. As the peroxide, there can be used benzoyl peroxide, t-butyl perbenzoate, etc.

In case of the epoxy resin, a mixture obtained by dissolving a resin and a curing agent in a solvent is usually used as the impregnating solution. As the curing agent, there can be used acid anhydrides and amine compounds (e.g. triethylenetetramine, diethylenetriamine, 4,4-diaminodiphenylmethane, etc.).

In case of the melamine resin, paratoluenesulfonic acid as the catalyst is added to a resin solution and the resulting solution is used as the impregnating solution.

In case of the phenol resin, a resin is dissolved In a water-methanol mixture and the resulting solution is used as the Impregnating solution.

Examples of the rubber or thermoplastic resin of the flexible layer (B) include chlorinated polyethylene, polybutene, an ethylene-vinyl acetate copolymer, an ethylene-propylene-dlene copolymer, a chloroprene polymer, chlorosulfonated polyethylene, a styrene-butadiene copolymer, polyvinyl chloride, etc. The thickness of the layer (B) is from 1.5 to 3.0 mm.

When the rubber or thermoplastic resin is crosslinked, trithiocyanuric acid can be used as the crosslinking agent for chlorinated polyethylene. In case of polybutene, the ethylene-vinyl acetate copolymer, the ethylene-propylene-diene copolymer, the chloroprene polymer or chlorosulfonated polyethylene, peroxides such as dicumyl peroxide, etc. can be used. In case of the styrene-butadiene copolymer, sulfur can bemused The adhesive layer (C) may be a layer of only hot melt resin, or a layer containing other component. The first embodiment of the adhesive layer (C) is to use a hot melt resin having a melting point of 60° to 165° C. and a solubility parameter (SP value) of 7.4 to 10.9. Examples of the hot melt resin include an ethylene-vinyl acetate copolymer, an ethylene-acrylic acid copolymer, carboxylated polyethylene, polyurethane, polybutylene terephthalate and a modified ethylene-vinyl acetate copolymer. These are used alone, or in combination thereof as a mixed polymer alloy. The thickness of the adhesive layer (C) is casually from 3 to 500 µm, preferably from 5 to 300 µm, particularly from 5 to 200 µm. When the present invention is carried out, the hot melt resin is usually laminated as the polymer film, but it may also be molten and applied previously on the thermosetting resin-impregnated prepreg layer (A), the rubber or thermoplastic resin layer having a flexibility (B) or the pattern layer such as vinyl chloride pattern paper, etc., or It may be dissolved in a suitable solvent, applied and then dried.

The SP value is determined by a turbidimetric titration [K. W. Suh, D. H. Clarke, J. Polym. Sci., Part A-1, 5, 1671 (1967)].

When the melting point of the hot melt resin is less than 60° C., the service temperature of the laminate becomes low and it is not suitable for practical use. On the other hand, when it exceeds 165° C. the adherend flows excessively in the high-temperature atmosphere in case of forming the laminate. Therefore, a predetermined adhesion strength can not be obtained and a predetermined thickness of the product can not be maintained. Furthermore, the flow deformation of the thermoplastic resin is undesirably large. When the SP value is not within the above range, the SP value of the hot melt resin is quite different from that of the adherend. Therefore, the hot melt resin and adherend are not compatibilized each other and the objective laminate can not be obtained. When the thermosetting resin layer contains peroxides, it is preferred to add an antioxidant to the hot melt resin so as to prevent peroxidation deterioration of the hot melt resin adhesive layer. Examples of the antioxidant to be added include a phenolic antioxidant and phosphoric acid antioxidant such as 2,6-di-t-butyl-p-cresol (hereinafter referred to as "BHT"), 2,2'-methylenebis(4-methyl-6-t-butylphenol), trinonylphenyl phosphite, etc. They may be used alone or in combination thereof. The amount of the used antioxidant is preferably from 0.05 to 1.0% by weight, based on the weight of the hot melt resin.

In addition, the second embodiment of the adhesive layer (C) of the present invention is that formed by coating or laminating a hot melt resin on both surfaces of a reinforcing core material comprising a metal foil, a punching metal foil or a plain weave not made of ribbon-like metal yarns having a thickness of 10 to 200 µm, said metal being selected from aluminum, iron, copper, zinc and lead.

The thickness of the reinforcing core material is from 10 to 200 µm, preferably from 20 to 50 µm. When the thickness is less than 10 µm, the tearing or wrinkle is generated by a pressure at the time of heat bonding. On the other hand, when it exceeds 200 µm, the cost becomes disadvantageously high. When the present invention is carried out, the above hot melt resin is coated or laminated on both surfaces of the metal reinforcing core material. The film thickness of the hot melt resin layer to be coated or laminated is preferably from 3 to 100 µm. When the film thickness Is less than 3 µm, the adhesive force is undesirably lowered.

By interposing this metal foil between the thermosetting resin layer and the rubber or thermoplastic resin layer, the heat resistance of the laminate is improved and, at the same time, the adhesion between the above layers due to the hot melt resin becomes firm, thereby reducing the film thickness of the adhesive layer (C). In addition, the warpage of the thermosetting resin prepreg layer (A) and the rubber or thermoplastic resin layer (B) due to the thermal strain can be prevented, thereby contributing to the dimensional stability. Furthermore, it Is also possible to prevent a non-perpendicular cut surface (the cut surface is not perpendicular to the laminate surface) which is frequently observed in a heterogeneous laminate, the generation of cracking at small end (the cracking is generated at the surface of the cut end part), etc.

In the third embodiment of the adhesive layer (C) of the present invention, the heat resistance can also be improved by using, as the adhesive layer (C), a dispersion layer obtained by dispersing, in the hot melt resin, particles of a metal or metal compound having a thermal conductivity of not smaller than 1 W M$^{-1}$ K$^{-1}$, preferably not smaller than 5 W M$^{-1}$ K$^{-1}$, or a metal compound having crystallization water.

When using the metal compound having crystallization water, an endothermic action on the heating is obtained, thereby improving the heat resistance.

Examples of the metal or metal compound having a thermal conductivity of not smaller than 1 W M$^{-1}$ K$^{-1}$ include the following metals, metal oxides, metal salts of acids, silicon compounds:

metals such as aluminum, copper, zinc, et, metal oxides such as aluminum oxide, copper oxide, titanium oxide, zirconium oxide, etc.;

metal salts of acids, such as aluminum borate, etc.;

silicon compounds such as silicon carbide, etc.

Examples of the metal compound having crystallization water include aluminum hydroxide, aluminum primary phosphate, ammonium borate, hydrotalcite, etc.

The amount of the crystallization water is usually from 1 to 50 molecules, for example, from 1 to 5 molecules per one molecule of the metal compound.

The particle size of the metal and the metal compound is usually from 30 to 100 µm (average particle size).

When the amount of the metal or the metal compound is less than 100 parts by weight, based on 100 parts by weight of the hot melt resin, the improvement of the heat resistance is not sufficient. On the other hand, when it exceeds 500 parts by weight, the adhesion strength is lowered.

In the above case, the thickness of the adhesive layer (C) is usually from 10 to 300 µm, preferably from 20 to 300 µm. When the thickness is not within the above range, the adhesion strength is undesirably lowered.

When using the dispersion layer, the flexibility is superior to that obtained in case of using the metal foil and it can be easily applied to the concave part or curved surface. Therefore, the production process is simplified and it is economical.

The laminate of the present invention can be produced by bonding the thermosetting resin-impregnated prepreg layer (A) to the rubber or thermoplastic resin layer (B) with heating under pressure through the hot melt resin adhesive layer (C), using a pressing machine or a hot mill. A laminate having the embossed surface can also be obtained by using a pressing cover plate on which a designed concave-convex pattern is previously formed at the time of heating under pressure. When the layer (B) Is a plastic resin or non-crosslinked rubber, it is preferred to conduct the removal from the press machine after cooling. According to the above process, the layer (A) is adhered to the layer (B) and, at the same time, the thermosetting resin-impregnated prepreg layer (A) is thermoset to from a hard resin surface layer. When the rubber or thermoplastic resin (B) contains the crosslinking agent, a laminate In which the rubber or thermoplastic resin layer is simultaneously crosslinked is formed.

It is preferred that the heating temperature is within a range of 130° to 165° C. When the heating temperature is less than 130° C. the prepreg is not cured. On the other hand, when It exceeds 165° C., the adherend flows excessively in the high-temperature atmosphere. Therefore, a predetermined adhesion strength can not be obtained and a predetermined thickness can not be maintained. The pressure Is usually from 7 to 15 kg/cm$^2$, and the heating time under pressure is from 10 to 40 minutes.

According to the present invention, there can be obtained a laminate which is superior in design (e.g. having a deep embossable surface) and construction properties capable of conducting easily the cutting operation by cutter knife, the application to the curved surface, etc. in the construction field while maintaining excellent characteristics of the thermosetting resin (e.g. the heat resistance, the wear resistance, the scratch resistance, the resistance to pollution by tar of cigarette, etc.), by heat bonding the rubber or thermoplastic resin layer with the thermosetting resin layer through the hot melt resin adhesive layer. In addition, the warpage of the laminate is excluded and the dimensional stability is improved by interposing a reinforcing core material such as a metal foil into the adhesive layer. Regarding the laminate of the present invention, the formed emboss is not disappeared when used for a long period of time.

PREFERRED EMBODIMENT OF THE INVENTION

The laminate of the present Invention can be produced by bonding the thermosetting resin-impregnated prepreg layer (A) to the rubber or thermoplastic resin layer (B) through the hot melt resin adhesive layer (C) with heating under pressure, by using a pressing machine or hot mill. The adhesive layer (C) may be those obtained by coating or laminating the hot melt resin on both surfaces of the metal foil or those obtained by dispersing the particulate metal compound having good thermal conductivity or crystallization water In the hot melt resin, in addition to the hot melt resin alone. In order to improve the design of the laminate, the pattern layer such as vinyl chloride pattern paper, etc. may also be Interposed between the thermosetting resin layer (A) and the adhesive layer (C).

The following Examples and Comparative Examples further illustrate the present invention in detail but do not limit the scope of the present Invention.

(A) Preparation of a prepreg

| Component | Amount (parts by weight) |
|---|---|
| Diallyl phthalate prepolymer (average molecular weight: 10,000) | 70 |
| Unsaturated polyester (condensate of isophthalic acid, maleic acid and ethylene glycol) | 30 |
| Benzoyl peroxide | 3.0 |
| Internal mold release agent DR-20S (manufactured by Daiso Co. Ltd.) | 0.03 |
| Hydroquinone | 0.05 |
| Solvent [toluene/acetone (=1:2)] | 100 |

An impregnating solution was prepared according to the above formulation. A pattern paper (basis weight, 80 g/m$^2$) was impregnated with the above impregnating solution, and then dried (at 80° to 90° C. for 15 minutes) so that the resin content (RC) became 50% by weight to give a pattern paper prepreg (1).

According to the same manner as in the prepreg (1), a polyester nonwoven fabric (basis weight, 40 g/m$^2$) was impregnated to give a transparent overlay prepreg (1') having the resin content (RG) of 80% by weight.

According to the same manner as described above, a mixed paper containing 13% by weight of alumina (basis weight: 30 g/m$^2$) was impregnated, and then dried to give a transparent overlay prepreg (1").

(B) Preparation of a rubber or thermoplastic resin layer (sheet)

| Component | Amount (parts by weight) |
| --- | --- |
| Chlorinated polyethylene rubber (average molecular weight: 120,000, chlorine content: 35% by weight) | 100 |
| Heavy-duty calcium carbonate | 300 |
| Dioctyl phthalate | 70 |
| Magnesium oxide | 10 |
| Trithiocyanuric acid (crosslinking agent) | 2 |
| Pipecoline methylpentamethylenedithiocarbamate (crosslinking auxiliary) | 1 |

The above formulation components were kneaded with a twin roll at 80° C. to give a pale yellow sheet (2) having a thickness of 3.0 mm.

| Component | Amount (parts by weight) |
| --- | --- |
| Vinyl chloride resin(polymerization degree: 1,000) | 100 |
| Heavy-duty calcium carbonate | 200 |
| Plasticizer, dioctyl phthalate (DOP) | 50 |
| Tribasic lead sulfate | 3 |
| Dibasic lead phosphite | 1 |
| Carbon | 2 |
| Bisamide | 1 |

Then, the above formulation components were kneaded with a roll at 170° C. to give a sheet (2') having a thickness of 3.0 mm.

EXAMPLE 1

Laminate having a basic construction of the present invention (laminate of FIG. 1)

An overlay paper prepreg (1'), a pattern paper prepreg (1), a hot melt film (3') and a sheet (2) (the thermoplastic resin or rubber layer) were introduced In a hot press according to the constitution of FIG. 1, and then heated at the temperature of 150° C. under the pressure of 10 kg/Cm$^2$ for 30 minutes to give a laminate of 3.1 mm×500 mm×500 mm. The hot melt film (3') was an ethylene-vinyl acetate copolymer (melting point: 66° C., SP value: 9.0, thickness: 30 µm) containing BHT as the antioxidant in the amount of 0.2% by weight based on the weight of the resin. In order to examine the heat resistance of this laminate, an aluminum container (volume: 1 liter) containing a vegetable oil at 180° C. was placed on the surface of the laminate and then allowed to stand for 20 minutes (JIS-K6902). Then, the aluminum container was removed and the surface was observed. As a result, no change was observed on the surface.

A wear resistance test was conducted using a Taber abrader (JIS-K6902) until a half of the pattern of the pattern paper was worn out The result was 3,200 revolutions.

A change (%) in dimension after standing in a Geer oven at 80° C. for 6 hours (JIS-A-5705) was 0.2% In length and 0.15% in width.

Regarding the plate warpage test, the laminate (500 mm×500 mm) after molding was placed on a glass plate and, after standing at 20° C. for 24 hours, the plate warpage of four sides at the periphery of the plate was respectively measured, and then the average value was taken as the plate warpage value. Regarding this laminate, the shape of the plate warpage is a convex form, and the plate warpage value was +1.0 mm.

In the pollution resistance test, a blue ink, a red ink, a shoe polish (black) and a hair dye (Bigen Cream Tone 5G, manufactured by Hoyu Co., Ltd.) were respectively applied to the laminate which was allowed to stand for 6 hours and, after wiping with a cloth, the pollution degree was observed. As a result, a pollution was not observed at all.

EXAMPLE 2

Laminate of the present invention wherein the plate warpage is prevented by reinforcing an adhesive layer with a metal foil etc. (laminate of FIG. 2)

Figure 2:
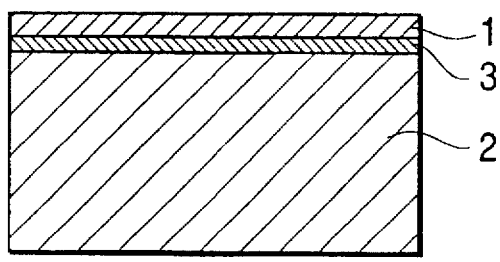
FIG. 2 is a schematic cross sectional view of the laminate of the present invention, wherein the warpage is prevented by reinforcing an adhesive layer with a metal oil.

A pattern paper prepreg (1), an adhesive layer (3) obtained by extrusion laminating a hot melt resin on both surfaces of a metal core material and a sheet (2) (the thermoplastic resin or rubber layer) were heat-pressed according to the constitution of FIG. 2 at the temperature of 150° C. under the pressure of 13 kg/cm$^2$ for 25 minutes to give a laminate of 3.05 mm×500 mm ×500 mm. The adhesive layer (3) was one obtained by extrusion laminating a carboxylated polyethylene resin (NacAce GB201 manufactured by Nippon Yunicar Co., Ltd., melting point 93° C., SP value: 7.9) having a thickness of 50 µm on both surfaces of a reinforcing core material of an aluminum foil having a thickness of 100 µm.

According to the same manner as described in Example 1, a heat resistance test was conducted (JIS-K-6902). As a result, no change was observed on the surface. A change (%) in dimension was measured according to JIS-A-5705. The result was 0.02% In length and 0.02% in width. According to the same manner as described in Example 1, the plate warpage was measured. As a result, the shape of the plate warpage was a convex form, and the plate warpage value was +0.5 mm.

EXAMPLE 3

Figure 3:
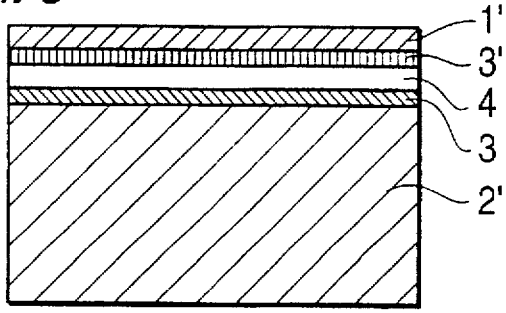
FIG. 3 is a schematic cross sectional view of the laminate of the present invention, wherein a design is improved by interposing a pattern layer.

Laminate of the present invention, wherein a metal foil is inserted so as to reduce a plate warpage and, at the same time, a design is improved by Interposing a vinyl chloride pattern paper as a pattern layer (laminate of FIG. 3) An overlay paper prepreg (1'), a sheet (2')as the thermoplastic resin or rubber layer, an adhesive layer (3) obtained by coating a hot melt resin on both surfaces of a metal core material, a hot melt film (3') and a vinyl chloride pattern paper (4) having a printed pattern (thickness: 100 µm) were heat-pressed according to the constitution of FIG. 3 at the temperature of 135° C. under the pressure of 13 kg/cm$^2$ for 15 minutes to obtain a laminate of 3.2 mm ×500 mm×500 mm.

The adhesive layer (3) was one obtained by coating an acetone solution (50% by weight) of an ethylene-vinyl acetate copolymer (melting point: 66° C., SP value: 9.0) containing BHT in the amount of 0.2% by weight based on the weight of the resin on both surfaces of an aluminum foil having a thickness of 50 µm as a reinforcing core material using a gravure roll so that the thickness after drying became 3.5 µm. The hot melt film (3') was an ethylene-vinyl acetate copolymer film (melting point: 66° C., SP value: 9.0, thickness: 30µm) containing 0.2% by weight of BHT. According to the same 10 manner as described in Example 1, surface characteristics of this laminate were examined. No change was observed with respect to the heat resistance test A Taber abrasion test (JIS-K-6902) was conducted until a half of the vinyl chloride printed pattern was worn out. The result was 2,000 revolutions.

EXAMPLE 2

Laminate of the present invention, wherein a metal foil is inserted so as to reduce a plate warpage and, at the same time, a design is improved by interposing a vinyl chloride pattern paper As a pattern layer (laminate of FIG. 3)

According to the same manner and constitution as described in Example 3 except for using an overlay paper prepreg obtained previously by melting an ethylene-vinyl acetate copolymer (melting point: 66° C., SP value: 9.0) containing BHT as the antioxidant in the amount of 0.2% by weight based on the weight of the resin and coating it in the thickness of 30 μm by an extrusion laminator at 110° C. In place of the overlay paper prepreg (1') and the hot melt film (3'), a laminate of 3.2 mm×500 mm×500 mm was obtained.

According to the same manner as described in Example 1, the heat resistance test was conducted. As a result, no change was observed on the surface.. In addition, the Taber abrasion test (JIS-K-6902) was conducted until a half of the printed pattern of the vinyl chloride pattern paper was worn out. The result was 2,100 revolutions.

EXAMPLE 5

Figure 4:
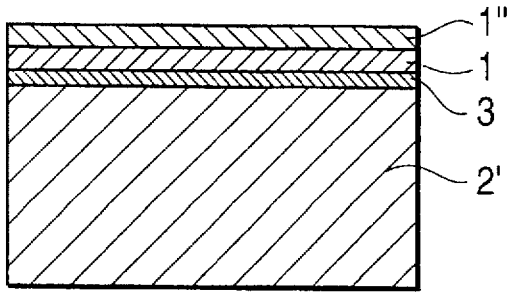
FIG. 4 is a schematic cross section illustrating the laminate of the present invention, wherein a metal foil is inserted so as to reduce warpage and a design is improved by interposing a pattern layer.

Laminate of the present invention, wherein a metal foil Is inserted so as to reduce a plate warpage and, at the same time, a design is improved by interposing a pattern paper prepreg as a pattern layer (laminate of FIG. 4) 10 An overlay paper prepreg (1"), a pattern paper prepreg (1), a sheet (2') as the thermoplastic resin or rubber layer and an adhesive layer (3) obtained by transferring a hot melt film on both surfaces of a metal core material were heat-pressed according to the constitution of FIG. 4 at the temperature of 135° C. under the pressure of 13 kg/cm² for 25 minutes to give a laminate of 3.05 mm×500 mm×500 mm.

The adhesive layer (3) was obtained by transferring an ethylene-acrylic acid copolymer hot melt film (melting point: 92° C., SP value: 9.0, thickness: 30 μm) containing 0.2% by weight of BHT on both surfaces of an aluminum foil having a thickness of 30 μm as the reinforcing core material.

According to the same manner as described in Example 1, surface characteristics of this laminate were examined. As a result, no change was observed on the surface, In addition, a light of a cigarette was put on the laminate and allowed to stand for about 7 minutes, and then a change in surface after putting out the cigarette was observed. As a result, no abnormality was observed. A Tabor abrasion test (JIS-K-6902) was conducted until a half of the pattern of the pattern paper was worn out. The result was 3,500 revolutions.

EXAMPLE 6

Laminate using a dispersion layer as an adhesive layer (laminate of FIG. 1)

According to the same manner as described in Example 1 except that a dispersion obtained by mixing 100 parts by weight of an ethylene-vinyl acetate copolymer (melting point, 66° C., SP value: 9.0), 0.3 parts by weight of BHT, 250 parts by weight of alumina AL-30 (manufactured by Showa Denko Co., Ltd., average particle size: 35 μm, and 100 parts by weight of titanium oxide (TITONE A-150 manufactured by Sakai Kagaku Kogyo Co., Ltd., average particle size: 40 μm) at the temperature of 120° C. to form a film (3") having a thickness of 100 μm was used as the adhesive layer (3'), a sheet (2') was used as the thermoplastic resin or rubber layer in place-of the sheet (2) and the heating was conducted at the temperature of 135° C. under the pressure of 13 kg/cm² for 15 minutes, a laminate of 3.1 mm×500 mm×500 mm was obtained.

This laminate has a good flexibility, and surface characteristics of this laminate were evaluated according to the same manner as described in Example 1. As a result, no change was observed,.ith respect to the heat resistance. In addition, a light of a cigarette was put on the laminate and allowed to stand for about 5 minutes. Then, the cigarette was removed and a change in surface was observed. As a result, no abnormality was observed.

COMPARATIVE EXAMPLE 1

According to the same manner as described in Example 1 except for using a polyamide film (melting point: 172° C. SP value: 12.5) as the hot malt film and heat pressing at the temperature of 180° C. under the pressure of 10 kg/cm² for 20 minutes, a laminate of 2.95 mm×500 mm×500 mm was obtained. The laminate was cut, and then the cross section was observed. As a result, a peeling was observed in the hot melt layer. Since the rubber layer flowed excessively at the high-temperature molding, a laminate having a predetermined thickness was not obtained.

COMPARATIVE EXAMPLE 2

According to the same manner and constitution as described in Example 1 except that an ethylene-based three-dimensional copolymer (H2500 manufactured by Kurashiki Boseki Co., Ltd., SP value: 8.5, melting point: 94° C.) was used as the hot melt film, a heat press was conducted at the temperature of 130° C. under the pressure of 10 kg/cm² for 15 minutes. However, the resulting laminate was inferior in adhesion.

What is claimed is:

1. A laminate comprising (A) a thermosetting resin-impregnated prepreg layer constituting a surface layer, (B) a rubber or thermoplastic resin layer having a good flexibility and (C) a hot melt resin adhesive layer, said hot melt resin adhesive layer being interposed between said thermosetting resin-impregnated prepreg layer and said rubber or thermoplastic resin layer;

wherein said layer (A) is a prepreg impregnated with a thermosetting resin selected from a diallyl phthalate resin or an unsaturated polyester; the rubber or resin of the layer (B) is a rubber or a thermoplastic resin selected from chlorinated polyethylene or polyvinyl chloride; and said hot melt resin adhesive layer (C) comprises a hot melt resin having a melting point of 60° to 165° C. and a solubility parameter (SP value) of 7.4 to 10.9, selected from an ethylene-vinyl acetate copolymer, an ethylene-acrylic acid copolymer, carboxylated polyethylene, polyurethane, polybutylene terephthalate and a modified ethylene-vinyl acetate copolymer, and wherein said hot melt resin adhesive layer (C) is formed by applying or laminating said hot melt resin on both surfaces of a reinforcing core material comprising a metal foil, a punching metal foil or a plain weave net made of ribbon metal yarns, said reinforcing core material having a thickness of 10 to 200 μm, said metal being selected from the group consisting of aluminum, iron, copper, zinc and lead.

2. The laminate according to claim 1, wherein an antioxidant is added to said hot melt resin constituting said hot melt resin adhesive layer (C).

3. The laminate according to claim 1, wherein said hot melt resin adhesive layer (C) contains a particulate metal or metal compound having a thermal conductivity of not smaller than $1 \text{ W M}^{-1} \text{ K}^{-1}$ or having a water of crystallization in an amount of 100 to 500 parts by weight, based on 100 parts by weight of the hot melt resin.

4. The laminate according to claim 1, wherein a pattern layer is present between said thermosetting resin-impregnated prepreg layer (A) and said adhesive layer (C).

5. The laminate according to claim 4, wherein said adhesive layer (C) is further present between said thermosetting resin-impregnated prepreg layer (A) and said pattern layer.

6. The laminate according to claim 1, wherein said thermosetting resin-impregnated prepreg layer (A) is obtained by impregnating a prepreg substrate selected from a handmade paper, a mixed paper obtained by blending a mineral having a high thermal conductivity, a woven or nonwoven fabric made of natural or synthetic fibers, a pattern paper and a kraft paper with a thermosetting resin.

* * * * *